United States Patent [19]

Williams

[11] Patent Number: 4,606,521
[45] Date of Patent: Aug. 19, 1986

[54] CYLINDER HOLDER

[76] Inventor: Gary R. Williams, 943 Daisy Ave., Carlsbad, Calif. 92008

[21] Appl. No.: 539,664

[22] Filed: Oct. 6, 1983

[51] Int. Cl.4 .............................................. F16M 13/00
[52] U.S. Cl. ...................................... 248/214; 248/62;
248/301; 248/305; 248/316.7; 248/340; 24/339
[58] Field of Search .................. 248/316.1, 316.7, 313,
248/214, 215, 340, 499, 58, 62, 74.1, 311.2, 312,
301, 305, 68.1, 48.2, 61; 24/339, 336, 335

[56] References Cited

U.S. PATENT DOCUMENTS

| 810,004 | 1/1906 | Tabler | 248/61 |
|---|---|---|---|
| 1,546,576 | 7/1925 | Erwin | 248/313 |
| 2,376,314 | 5/1945 | Cogswell . | |
| 2,453,319 | 11/1948 | Hollyday . | |
| 2,862,271 | 12/1958 | Harley | 24/23 B |
| 2,936,992 | 5/1960 | Browning | 248/499 |
| 3,061,253 | 10/1962 | Keaton . | |
| 3,218,012 | 11/1965 | Volpe | 248/62 |
| 3,254,817 | 6/1966 | Bartz . | |
| 3,363,865 | 1/1968 | Metsker . | |
| 3,532,312 | 10/1970 | Kopf | 248/303 |
| 3,586,276 | 6/1971 | O'Mahoney | 248/215 |
| 3,756,481 | 9/1973 | Schaefer . | |
| 3,817,435 | 6/1974 | De Luca . | |
| 3,820,696 | 6/1974 | Gongolewski . | |
| 3,844,459 | 10/1974 | Chambers . | |
| 3,857,598 | 12/1974 | Jelich . | |
| 3,967,848 | 7/1976 | Sowle . | |
| 3,994,048 | 11/1976 | Rosenthal | 24/306 |
| 4,073,317 | 2/1978 | Ellis | 24/270 |
| 4,132,381 | 1/1979 | McClellan | 248/305 |
| 4,133,467 | 1/1979 | Mackniesh . | |
| 4,159,729 | 7/1979 | Schwartz . | |

FOREIGN PATENT DOCUMENTS 4365 of 1914 United Kingdom ................ 248/340

Primary Examiner—J. Franklin Foss
Assistant Examiner—Robert A. Olson
Attorney, Agent, or Firm—Oldham, Oldham & Weber Co.

[57] ABSTRACT

The invention comprises a holder for a compressed gas cylinder which allows the cylinder to be secured to the side railing of an emergency stretcher or cot. A curvature lip is positioned over the railing and allows the holder and cylinder assembly to rotate freely when the railing is lowered.

10 Claims, 4 Drawing Figures

CYLINDER HOLDER

TECHNICAL FIELD

This invention lies in the art of retention brackets and more particularly in the field of securement means for compressed gas cylinders. Specifically, the invention comprises a curvate holder for receiving a cylinder, having means for attachment to a horizontal support.

BACKGROUND ART

The use of bottled gasses for various industrial and medical purposes requires that the cylinder containing the gas be secured in some fashion to prevent possible damage, both to the cylinder itself and to the surrounding environment. A particularly difficult securement situation is in the area of emergency medical treatment where a patient or victim is given oxygen after having been placed on a stretcher. The oxygen is usually contained in a "D" size cylinder which heretofore has either been secured by one of a number of complicated arrangements beneath the stretcher, or by simply laying it next to the patient and using a cot strap for retention. In some instances, even the latter is not used, the cylinder merely resting between the patient's legs on the stretcher or on the floor of the emergency vehicle in which the patient is being transported. During transport to the hospital, unsecured or poorly secured cylinders are potentially lethal missles which could be launched anytime the vehicle lurches, stops suddenly, or is involved in a collison.

Those devices of the prior art which do provide adequate securement do not readily lend themselves to portability when the stretcher is transferred to or from the emergency vehicle. Often times it is a tedious task to remove the cylinder from the stretcher when the patient or victim is transferred to a bed or other supporting member.

A number of prior art patents fall generally in the area of holding devices for cylindrical objects. U.S. Pat. No. 3,967,848 provides a means for holding a container such as a cup. The novelty lies in the ability of the holder to pivot to a compact shape when not in use. There is no mention of any application to a compressed gas cylinder. U.S. Pat. No. 3,844,459 describes a bracket means for removably securing the housing of an insulated beverage container. The invention is generally applicable to securing a container to a golf cart and does not mention securement to a stretcher or cot railing.

U.S. Pat. No. 3,857,598 teaches a device for handling, transporting and positioning a container commonly utilized for containing semiconductor wafers. There is no structure comparable to applicant's device. U.S. Pat. No. 3,817,435 describes a holder and transporter for compressed gas cylinders. The structure of this device is considerably different from applicants and is not useful in securing a cylinder to the railing of a stretcher.

Additional U.S. patents found in this area include U.S. Pat. Nos. 3,820,696; 3,756,481; 4,159,729; 4,133,467 and 3,254,817. None of these patents disclose applicant's invention, and thus are not pertinent.

Thus it can be seen that there is a need in the art for a relatively simple device which will firmly secure a compressed gas cylinder to a cot or stretcher yet is easily removable when the situation requires. This need is met by the instant invention.

DISCLOSURE OF THE INVENTION

It is accordingly an aspect of the invention to provide a device for holding a compressed gas cylinder.

Another aspect of the invention is to provide a device, as above, which can be attached to the rail of an emergency stretcher.

Yet another aspect of the invention is to provide a device, as above, which will rotate on a rail when the latter is lowered, so that the cylinder remains horizontal.

Still another aspect of the invention is to provide a device, as above, which has a means for hand carrying of a cylinder.

Yet another aspect of the invention is to provide a device, as above, which firmly secures a cylinder to a stretcher during transport in an emergency vehicle.

Still another aspect of the invention is to provide a device, as above, which allows quick removal and replacement of a cylinder.

Yet another aspect of the invention is to provide a device, as above, which utilizes quick release straps for holding the cylinder in place.

Still another aspect of the invention is to provide a device, as above, having a retention bracket and a retention clip to aid in securement of the cylinder to the device and the device to the railing respectively.

These aspects and others which are described more fully hereinbelow are achieved by: a holder for a compressed gas cylinder, comprising: a curvate section which receives a cylinder, providing an open portion therefore; a bracket section integrally connected to said curvate section and having a curvate retaining lip; means for securing said cylinder in said curvate section; wherein said retaining lip is pivotally disposed over the railing of a stretcher allowing said holder to rotate thereby.

BRIEF DESCRIPTION OF THE DRAWINGS

In order to more fully understand the teachings of the invention, the following disclosure should be read in conjunction with the drawings, wherein.

BEST MODE FOR CARRYING OUT THE INVENTION

Figure 1:
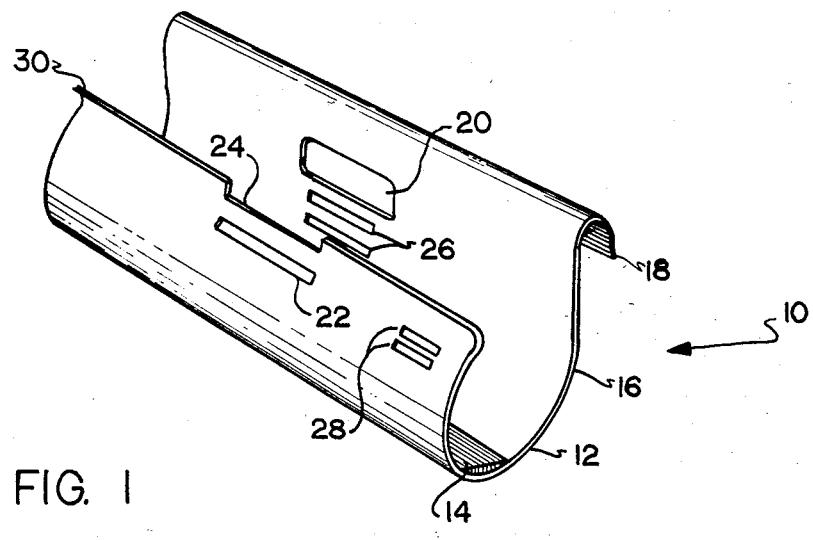
FIG. 1 is an isometric view of the cylinder holding device.

The invention is best described with reference to the drawings and especially to FIGS. 1 and 2, wherein a holder for a compressed gas cylinder is indicated generally by the number 10. A curvate section 12 having a cushion 14 running the length of the holder receives a cylinder 32. Both the curvate section and a bracket section 16 contain a plurality of slots 22, 26 and 28 which are utilized for attachment of straps 34 and 40.

A cut out 24 is located immediately above strap retention slot 22 and facilitates the positioning of strap 34 over the cylinder. Insertion of the cylinder is aided by a lip 30 along the outer edge of the holder which prevents the cylinder from catching as it is positioned in place. A retaining lip 18 located at the end of the bracket section 16, fits over the horizontal rail 36 of a stretcher or cot. The radius of the retaining lip is such that the fit is sufficiently lose so that rotation of the holder about the cot rail 36 is not hindered by friction. The importance of this frictionless securement will be explained shortly.

Figure 2:
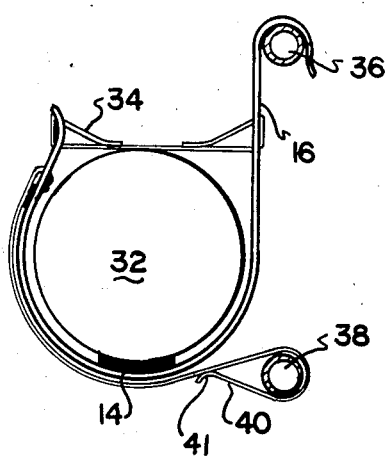
FIG. 2 is an end view of the same device as it appears attached to a stretcher rail and with a cylinder in place.

As shown specifically in FIG. 2, the strap 40 is wound about a second stretcher or cot rail 38. In so doing, the cylinder holder is prevented from rotating about the upper cot rail 36. The strap 40, however, possesses means for releaseable securement to itself, indicated by the number 41, which can be hook and loop fasteners or the like. Thus the cylinder holder can be secured against rotation or left free to swing as the occasion demands. Naturally other types of belts or the like can be used in the alternative, but hook and loop fasteners are preferred.

A description of the procedure used in applying the cylinder holder can best serve to demonstrate its function. A cylinder is pressed into the curvate portion 12 of the holder by manual means and secured in place using strap 34. Like strap 40, strap 34 has releasable securing means such as hook and loop fasteners. The cylinder rests on the elastomeric cushion 14 which helps prevent the cylinder from sliding along the length of the holder. The curvate portion 12 preferably has a radius of slightly less than that of the cylinder, and is thus required to expand slightly and provide a friction fit. The cylinder holder and assembly is then secured to an upper stretcher or cot rail 36. Strap 40 is then used to prevent rotation about the upper cot rail by securement to the lower railing 38. It is a simple matter, then, to utilize the bottled gas for the benefit of the victim or patient on the stretcher.

During the course of transference to a hospital or other location, it is necessary to attend to the patient, having the cot rail out of the way. The majority of available cot designs provide for pivotal rotation of the railing downward. As the railing is then rotated downward, the holder maintains the cylinder at the lowest center of gravity, thus minimizing disturbances in the gas supplied to the patient.

If the patient is to be moved from the stretcher, the holder and cylinder assembly is then easily transferred simply by lifting up on the carrying slot 20 and thereby dislodging the retaining lip from the upper railing. Naturally, if the patient is transferred to another stretcher or cot, the cylinder and holder can be secured by a process which is the reverse of that outlined above.

Regarding the materials of construction of the holder, they are entirely conventional in the art. Preferably however the holder is constructed of aluminum or a high impact, reinforced plastic to minimize possible damage during hard use. The elastomeric cushion can be any one of a number of well known rubbers, including the various foams made from urethane or the like. Strap 34, which retains the cylinder in place, can be leather or plastic, utilizing a buckle, but is preferably a plastic weave having a hook and loop fasteners which allow quick securement and release over the cylinder. The strap material should have a certain amount of stretch so that when pulled tight, a slight amount of downward tension or pressure is applied to the cylinder, which aids in securement. Strap 40 may also be a plastic weave having hook and loop fasteners, but is preferably a simple belt using a buckle. Strap 40 need not be of particularly sturdy construction, being used simply to hold the weight of the cylinder and holder assembly against the railing during transport of the stretcher.

Figure 3:
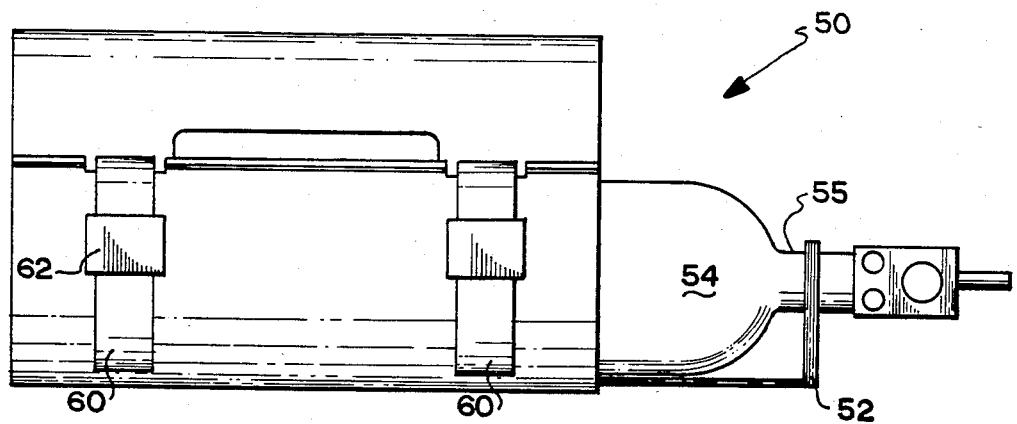
FIG. 3 is a side view of a second embodiment.
Figure 4:
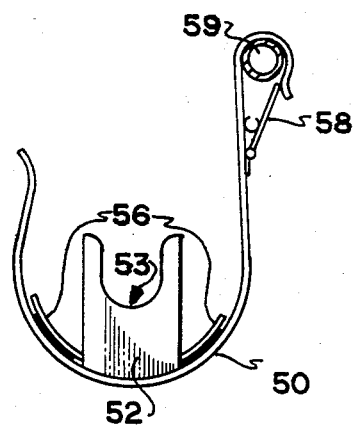
FIG. 4 is an end view of the second embodiment.

A second embodiment of the invention is illustrated in FIGS. 3 and 4. A cylinder holder is indicated by the number 50 and includes a cylinder retention bracket 52 having a notch 53. Bracket 52, firmly affixed to the bottom of the holder 50 by conventional means (not shown), extends outward from the holder to receive the yoke 55 of the cylinder. Movement of the cylinder is thereby restricted.

Affixed to the outer surface of the holder is a retention clip 58 which prevents the assembly from slipping off the cot railing 59. The clip may be spring loaded as shown. As can be seen particularly in FIG. 4, a pair of cushions 56 are used, one on either side of the retention bracket. This provides that the cylinder remains flush with as large a surface area as possible to enhance frictional securement.

This second embodiment also uses a pair of straps 60 which function analogously to strap 34 in the previous embodiment, however, in place of hook and loop fasteners or buckles spring latches 62 can be used. These latter are well known in the art, comprising a spring loaded loop which engages a hook affixed to the strap. A hinged lever is then used to draw the strap tight.

It will be appreciated that the features of this second embodiment are interchangable with the first. That is, any combination of elements described above can be incorporated into the cylinder holder without departing from the scope of the invention. For example, it may be found that in some instances certain elements are not needed, such as strap 40 of the first embodiment. Similarly, a retention bracket 52 can be used with a strap 34.

It will further be appreciated that while various preferred aspects of the invention have been disclosed, the invention is not to be construed as being limited thereby. Rather, the disclosure should be read as being merely in compliance with the Patent Statutes which require only disclosure of the preferred embodiments. An understanding of the true scope of the invention can be had with reference to the following attached claims.

What is claimed is:

1. A holder for a compressed gas cylinder, comprising:
    a curvate section for receiving the cylinder, providing an open portion therefore;
    a bracket section integrally connected to said curvate setion and having a curvate retaining lip;
    means for securing said cylinder in said curvate section; and
    wherein said retaining lip is adapted to be pivotally disposed over the railing of a stretcher allowing said holder to rotate thereby and said means for securement comprises:
    a retention bracket attached to a bottom of said holder and having an extended portion which includes a notch for receiving said cylinder;
    a pair of elastomeric cushions disposed in said holder along either side of said retention bracket;
    a plurality of slots in said curvate and said bracket sections; and
    a plurality of straps received by said slots and passing over said open portion of said curvate section;
    wherein said straps are adapted to contact said cylinder and apply downward pressure thereto.

2. A holder according to claim 1, wherein said curvate section has a lip to facilitate insertion of said cylinder.

3. A holder according to claim 2, wherein said straps have hook and loop fasteners.

4. A holder according to claim 3, wherein said holder is constructed of reinforced plastic.

5. A holder according to claim 4, wherein said means for securement of said cylinder further includes a cut out positioned above a slot in said curvate section and flush with said lip.

6. A holder according to claim 2, wherein said straps utilizes a buckle.

7. A holder according to claim 6, wherein said holder includes a strap for removable securement of said holder to a second stretcher rail, preventing pivotal rotation about said first rail thereby.

8. A holder according to claim 1, wherein said holder includes a retention clip to prevent disengagement of said holder from said railing.

9. A holder according to claim 8, wherein said straps utilize spring latches.

10. A holder according to claim 3, wherein said holder is constructed of aluminum.

* * * * *